(12) United States Patent
Parle et al.

(10) Patent No.: US 7,717,484 B2
(45) Date of Patent: May 18, 2010

(54) VEHICLE PARTITION

(76) Inventors: Darrin Parle, 2468 Fifth Ave., San Rafael, CA (US) 94901; Alexis Kim, 8 Seminole Ave., Corte Madera, CA (US) 94925

( * ) Notice: Subject to any disclaimer, the term of this patent is extended or adjusted under 35 U.S.C. 154(b) by 80 days.

(21) Appl. No.: 12/228,133

(22) Filed: Aug. 11, 2008

(65) Prior Publication Data
US 2010/0032977 A1    Feb. 11, 2010

(51) Int. Cl.
*B60P 3/04* (2006.01)
(52) U.S. Cl. ............... 296/24.4; 296/24.46; 296/24.31; 296/24.43; 119/496
(58) Field of Classification Search ............... 296/24.4, 296/24.46, 24.43, 24.31, 84.1, 85; 119/496, 119/510, 516, 523, 482
See application file for complete search history.

(56) References Cited

U.S. PATENT DOCUMENTS

| | | | |
|---|---|---|---|
| 3,169,781 A | 2/1965 | Arbuzzino | |
| 3,190,687 A | 6/1965 | Johnson | |
| 4,924,814 A | 5/1990 | Beaudet | |
| 4,943,105 A | 7/1990 | Kacar | |
| 5,848,817 A | 12/1998 | Niehaus | |
| 6,012,753 A * | 1/2000 | Ordoyne et al. | 296/24.31 |
| 6,250,700 B1 | 6/2001 | Traxler | |
| 6,626,462 B2 * | 9/2003 | Saczalski et al. | 280/749 |
| 7,097,233 B2 * | 8/2006 | Sogame et al. | 296/180.1 |
| 7,195,297 B2 | 3/2007 | Murray | |
| 2006/0103155 A1 | 5/2006 | Spater | |

* cited by examiner

*Primary Examiner*—Glenn Dayoan
*Assistant Examiner*—Melissa A Black

(57) ABSTRACT

Vehicle Partition with a flexible partition constructed of standard netting, a rigid partition enclosure. A standard roll up spring within the enclosure allows the partition to roll up into the enclosure when not in use. A left and right retaining strap holds the enclosure to the head rest posts of a standard vehicle. A plurality of upwardly facing sockets located on the upper surface of the enclosure can engage a secondary partition having a plurality of downwardly facing posts. A pair of retaining clips are attached to the lower horizontal bar of the flexible enclosure. The clips can clamp to the lip of a standard seat pocket. A preferred embodiment includes the left and right retaining strap include a standard buckle also having the ability to adjust strap length.

3 Claims, 2 Drawing Sheets

VEHICLE PARTITION

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of restraining devices located inside a passenger motor vehicle and more specifically to a vehicle partition for restraining pets from entering the front passenger portion of the vehicle.

When a dog owner travels in a motor vehicle, it is wise to restrain the pet in the rear seat portion of the vehicle, and in so doing, prevent the dog from interfering with the driving activity of the owner as well as to offer some protection to the dog in the event of a sudden stop by the vehicle.

A number of inventors have tried to solve this problem by offering restraining barriers of various designs including W. M. Johnson U.S. Pat. No. 3,190,687, S. A. Abruzzino U.S. Pat. No. 3,169,781, A. Beaudet U.S. Pat. No. 4,924,814, D. J. Kacar et al U.S. Pat. No. 4,943,105, John H. Nichaus U.S. Pat. No. 5,848,817, Michael A Traxler U.S. Pat. No. 6,250,700, Gordon C. Spater application number 2006/0103155 and Kurt r. Murray et al U.S. Pat. No. 7,195,297.

While all of the above mentioned inventions seem to provide a barrier between the front seats and rear seats of a passenger vehicle, there is a deficiency in the prior technology. None of the designs shown in the prior art allow the user of the partition to easily and quickly retract the partition into a storage enclosure when not in use. Additionally, none of the prior art designs allow the user to easily and quickly remove or replace an upper partition that is located in the space between the two head rests of the front passenger seats. Finally, none of the prior art designs provide alternate methods and locations of attachment depending on the style of the vehicle.

BRIEF SUMMARY OF THE INVENTION

The primary object of the invention is to provide a portable vehicle partition that can be easily mounted on the head rest posts of a standard passenger motor vehicle.

Another object of the invention is to provide a portable vehicle partition that rolls up into a cylindrical enclosure when not in use.

Another object of the invention is to provide a portable vehicle partition that includes a secondary upper partition that can plug into the roll up enclosure.

A further object of the invention is to provide a method of securing the rolled down partition to the pockets found on the back of the front passenger seats.

Yet another object of the invention is to provide an alternate method of securing the rolled down partition to the back wall of the center console of the vehicle.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a vehicle partition comprising: a flexible partition constructed of standard netting, a rigid partition enclosure, a standard roll up spring within said enclosure allowing said partition to roll up into said enclosure when not in use, a left and right retaining strap that holds said enclosure to the head rest posts of a standard vehicle, a plurality of upwardly facing sockets located on the upper surface of said enclosure, a secondary partition having a plurality of downwardly facing posts that can engage said enclosure sockets, a pair of retaining clips each attached to each end to the lower horizontal bar of said flexible enclosure, and said clips can clamp to the lip of a standard seat pocket.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
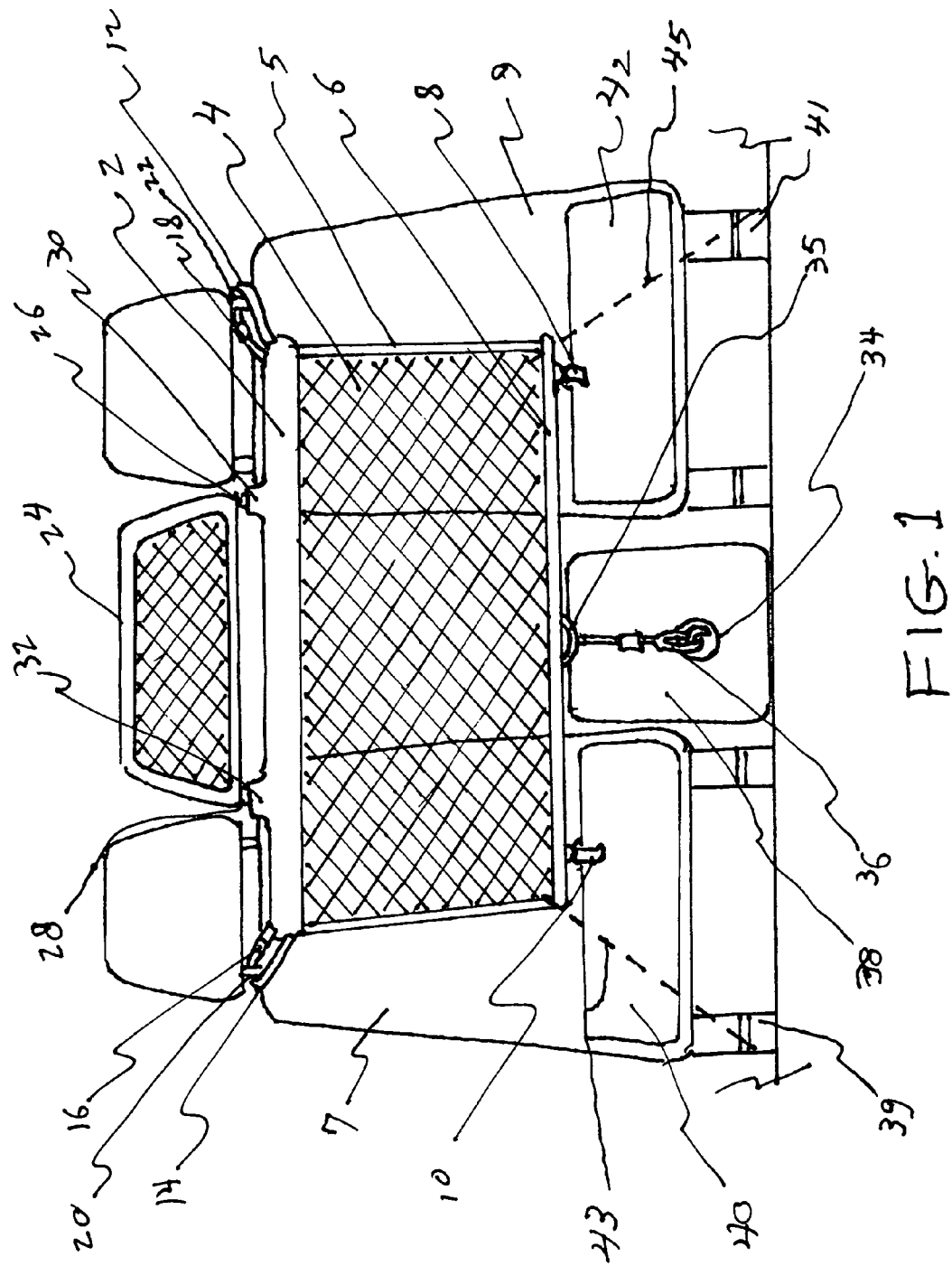
FIG. 1 is a view of the invention in use as seen from the back seat of a passenger motor vehicle.

Referring now to FIG. 1 we see a view of the vehicle partition of the present invention as seen from the rear seat of a standard passenger motor vehicle. This view shows the invention in the use position. The main partition 4 consists of standard netting trimmed on each side with standard biased tape 5. A rigid bottom bar 6 is fastened to the bottom portion of the netting 4. The netting has been rolled out of a rigid cylindrical enclosure 2. A roll up spring, not shown, within the enclosure allows the netting to retract back into the enclosure in the same way that a standard roll up window shade does. The cylindrical enclosure 2 is held at each end by straps 12, 14 to the head rest posts 20, 22 of the front seats 7, 9. Standard buckle clasps 16, 18 secure the straps 12, 14 and can also act to adjust the length of the strap in a standard way. The bottom bar 6 can be held in place in a variety of ways. One way is to use the spring clips 8, 10 that are fastened to the bottom bar 6 and to attach those clips 8, 10 by a clamping means to the lips of standard seat pockets 40, 42. found in many standard passenger vehicles. An alternate method of attachment is provided where a central strap 36 is fastened to a loop 35 which is fixed to the mid point of the bar 6. The central strap 36 includes a loop which can engage a downwardly facing hook 34 which has been fastened to the central portion of the rear surface of the center console 38 found in many standard passenger vehicles. A third method of attachment can be to hook a standard bungee cord from each side of the bar 6 to the front seat mounting brackets 39, 41 as shown by dotted lines 43, 45.

Secondary upper partition 24 takes up the space between the front passenger seat head rests. The partition 24 can by used as needed, for example when a large dog is being restrained in the back seat and is large enough to poke his or her head over the rigid enclosure 2. The partition 24 has a plurality of downwardly facing posts 26, 28 which removably and replacably plug into sockets 30, 32 located on the top surface of the enclosure 6. The present embodiment of partition 24 shows a rigid frame structure with standard netting filling the space created by the frame. This embodiment allows the driver to have a relatively unobstructed view when looking in the rear view mirror, or when checking on the dog located in the back seat.

Figure 2:
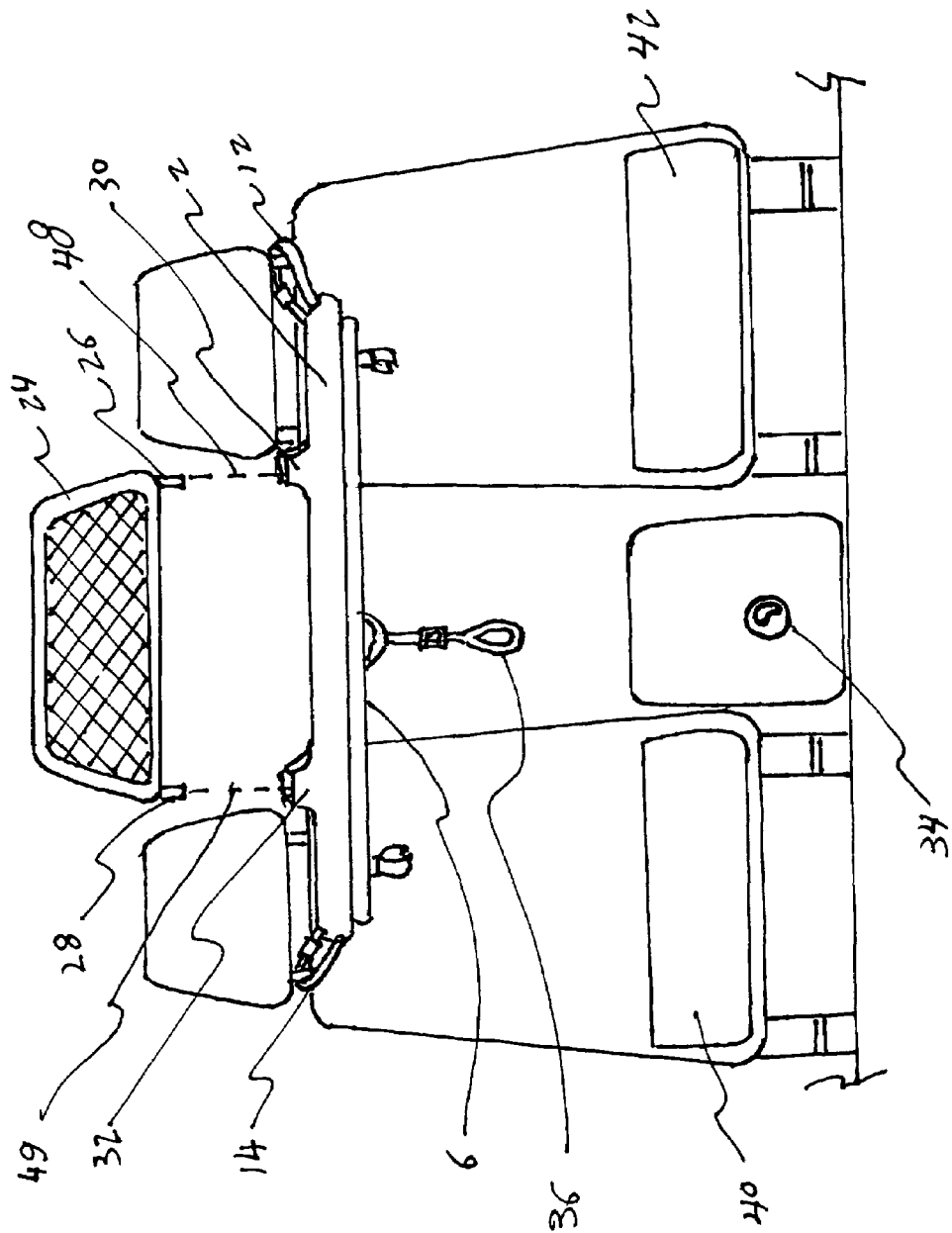
FIG. 2 is a view of the invention in the storage mode as seen from the back seat of a passenger motor vehicle.

FIG. 2 shows a view of the vehicle partition of the present invention as seen from the rear seat of a standard passenger motor vehicle where the partition 4 is in the stored position within the enclosure 2. This view also shows how the downwardly facing posts 26, 28 of the secondary upper partition 24 plug into mating sockets 30, 32 located on the top surface of the enclosure 2 as indicated by dotted lines 48, 49. Central fastening point 34 can be clearly seen as it is adhered by standard means, such as double sided adhesive tape, to the rear portion of the center console.

With the upper partition 24 removed and the main partition 4 rolled up into enclosure 2, the present invention becomes less obtrusive when the passenger vehicle is being used without having to restrain a pet in the back seat. And yet, the invention can be quickly and easily be deployed when necessary.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A vehicle partition comprising:
   a flexible partition,
      said flexible partition comprising:
         a rigid partition enclosure;
         a roll-up spring within said rigid enclosure for rolling up said flexible partition into said rigid enclosure for storage;
         left and right retaining straps attached to left and right ends of said rigid enclosure to secure said rigid enclosure to a post of a left and right headrest of a vehicle;
         a plurality of upwardly facing sockets on an upper surface of said rigid enclosure;
         a pair of retaining clips, attached to a lower horizontal bar of said flexible partition; and
      said retaining clips clamp to a lip of a seat pocket of said vehicle when said flexible partition is in a deployed position;
   a secondary partition,
      said secondary partition comprising:
         a plurality of downwardly facing posts engageable with said upwardly facing sockets for attaching said secondary partition between said left and right headrests.

2. Vehicle Partition as claimed in claim 1, wherein said left and right retaining straps each include a buckle to adjust retaining strap length.

3. Vehicle Partition as claimed in claim 1, wherein said flexible partition further comprising a central strap on said lower horizontal bar attachable to a hook on a back surface of a center console of said vehicle.

\* \* \* \* \*